May 11, 1954     A. J. RICHARDSON     2,678,058
FLUSH TANK VALVE FOR COMMODES
Filed March 10, 1952
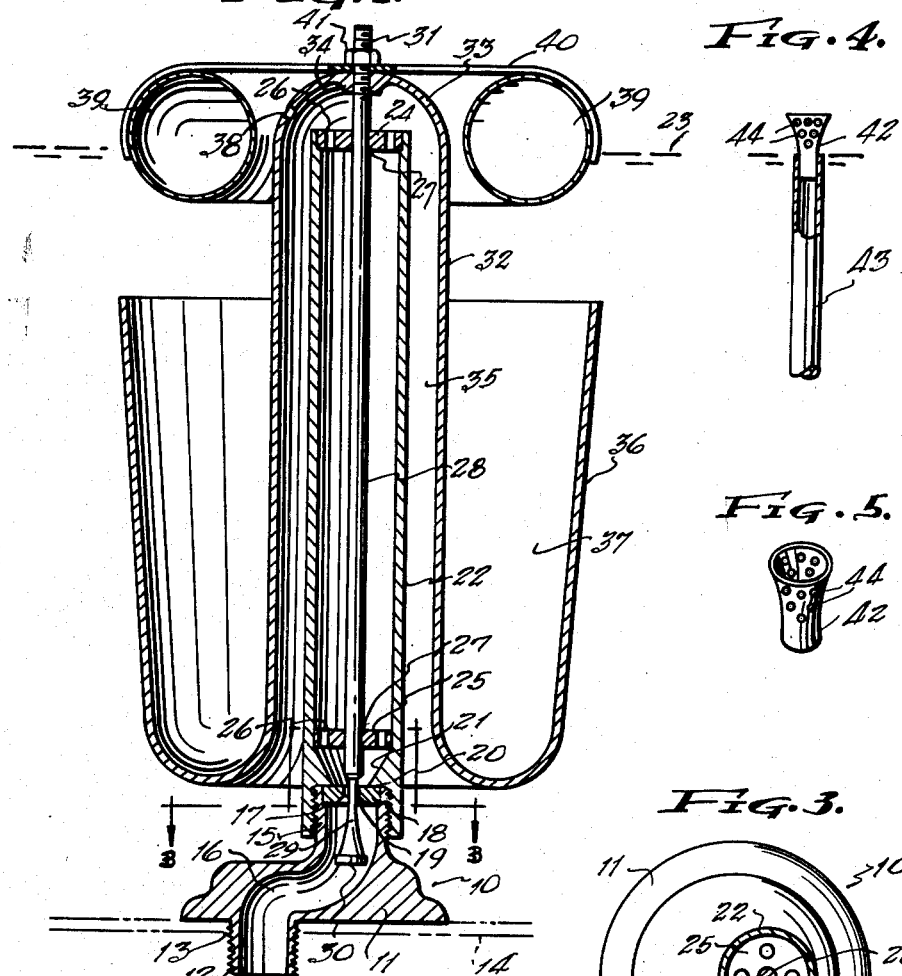
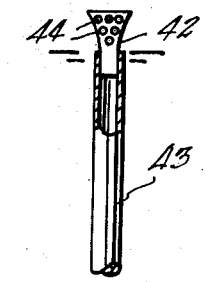
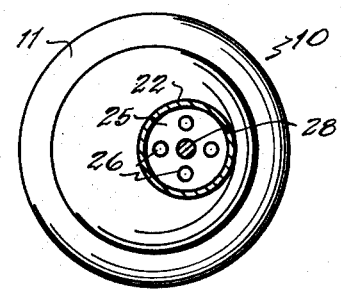
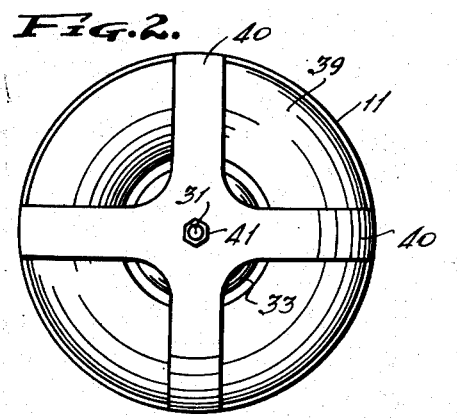
ANDREW J. RICHARDSON
INVENTOR.
BY *Cecil L. Wood*
ATTORNEY Patented May 11, 1954

2,678,058

UNITED STATES PATENT OFFICE 2,678,058

FLUSH TANK VALVE FOR COMMODES

Andrew J. Richardson, Lubbock, Tex., assignor, by mesne assignments, of one-half to Melvin Earsley, Lubbock, Tex.

Application March 10, 1952, Serial No. 275,743

6 Claims. (Cl. 137—216)

This invention relates to float actuated supply valves for commode tanks, and the like, and it has particular reference to valves of the type which is operated without the conventional arrangement of levers and a fulcrum float arm, and its principal object resides in the provision of a valve which is controlled by a circular float for closing the same, aided by a vented hood surrounding the water inlet tube.

Another object of the invention is that of providing a commode tank supply valve embodying an anti-syphoning tube for admitting water to said tank, and affording a counter-weight for the valve stem by the retention of a quantity of the tank water which tends to counter-act the inflow pressure against the vented hood while the tank is being replenished and before the water level reaches the float by which the valve is closed and is retained closed.

An object of the invention resides in the provision of a flush-tank valve which is positive in operation and generally requiring less maintenance attention than conventional type valves for a similar purpose, and affording an arrangement of parts whose simplicity of construction will insure economical operation and long life.

Broadly, the invention contemplates the provision of a flush-tank valve apparatus which will operate with a minimum of water turbulence, thus minimizing sound, while eliminating the syphoning action attributable to some types of conventional lever actuated valves.

While the foregoing objects are paramount, other and lesser objects will become manifest as the description proceeds, taken in connection with the appended drawings wherein:

Figure 1 is a vertical cross-sectional view of the invention illustrating the anti-syphon tube, the valve, the counter-weight hood and receptacle, and the float.

Figure 2 is a plan view of the invention showing the annular float and float bracket.

Figure 3 is a plan view of the water inlet fitting and showing the lower end of the anti-syphon tube in transverse section on lines 3—3 of Figure 1.

Figure 4 fragmentarily illustrates, in partial section, the upper end of the overflow tube and perforated extension therefor, and Figure 5 is a perspective view of the flared extension for the overflow tube shown in Figure 4.

The invention accordingly comprises a supply inlet fitting 10 which consists of a circular or oval base member 11 having an exteriorly threaded boss 12 which is extended through an aperture 13 in the bottom 14 of a flush tank, as shown in broken lines in Figure 1. Another exteriorly threaded boss 15 is formed on the top of the fitting 10 and a flow passage 16 is formed therethrough and the boss 12.

An annular recess 17 is formed in the upper end of the upper boss 15 to receive a seat 18 which has a port 19 concentrically thereof and whose underside is bevelled. The seat 18 is retained by the annular shoulder 20 formed by the conical inner surface 21 of the lowermost end of an inlet tube 22 which is threaded upon the boss 15 on top of the fitting 10. The tube 22 extends upwardly into the tank to the normal water level 23 therein and has guides 24 and 25 therein, one of which is located in the upper end of the tube 22 while the other is supported in the tube 22 near the bottom by the inwardly bevelled surface 21. Each of the guides 24 and 25 has a plurality of ports 26 therein and a central aperture 27.

A valve stem 28 is operatively arranged in the tube 22 and is slidably supported concentrically thereof by the guides 24 and 25, the stem 28 being arranged through the central apertures 27. The stem 28 has a reduced portion 29 at its lower end which operates through the port 19 and gradually increases in diameter downwardly to define a closure 30 on its lowermost end conformable to the bevelled seat 18 to close the same when the stem 28 is moved upwardly.

The upper end 31 of the stem 28 extends above the tube 22 and is threaded. A tubular hood 32 is supported on the upper end 31 of the stem 28 in the manner shown in Figure 1. The hood 32 has a dome-like closed upper end 33 and an interiorly threaded boss 34 formed therein by which the hood 32 is adjustably and detachably secured to the stem 28 so that the latter depends around and concentrically of the tube 22 defining an annular space 35 exteriorly thereof.

The hood 32 has an external upturned flange 36 formed therewith defining an annular channel or receptacle 37 which will contain a quantity of water when the tank fills and thus provide a counter-weight to aid in opening the valve, by urging the stem 28 downwardly when the flush valve is opened, and resist the inflow of water against the inside of the dome-like top of the hood 32 which has a relatively small vent 38 therein to prevent the water from being syphoned from the tank and permit air to escape from the hood 32.

Surrounding the upper end of the hood 32 is an annular float 39 which is attached to a mounting bracket 40 through which it is secured by a nut 41 to the upper end of the stem 28, as shown in Figures 1 and 2, and through which arrangement it can be adjusted to affect the water level 23.

When the commode is flushed by operating the flush valve to deliver the water from the tank the float 39 and the hood 32, with its receptacle 37, are lowered to move the stem 28 and the closure 30 away from its seat 18. Water is thus admitted to the tank through the seat 18 and flows upwardly through the tube 22 and over the top thereof and down through the space 35, a certain pressure being applied against the dome-like upper end of the hood 32 to aid the float 39 in closing the valve closure element 30. The receptacle 37, however, remains constantly filled and its weight will quickly open the valve to admit water.

In using the invention it is desirable to provide a flared extension sleeve 42 for the overflow tube 43 which is conventional equipment for all commode tanks. The sleeve 42, shown in detail in Figure 5, has a plurality of perforations 44 so arranged as to slowly discharge water from the tank through the overflow tube 43 until the valve is completely closed and the float 39 has properly adjusted itself.

Manifestly, the structure herein shown and described is capable of certain changes and modifications from time to time, by persons skilled in the art, without departing from the spirit and intent of the invention or the scope of the appended claims.

What is claimed is:

1. In a float valve for commode tanks, in combination, a fitting connected in the bottom of a tank to a supply pipe, an anti-syphon tube threadedly attached to said fitting and rising in said tank to the normal water-level in said tank, a ported valve seat arranged in the lower end of said tube and a plurality of spaced perforated guides in said tube, a valve stem operating in said guides concentrically of said tube and projecting hereabove, a closure element on the lower end of said stem engaging said seat, a cylindrical hood member surrounding said tube and having its upper end adjustably secured to the upper end of said valve stem and having an annular receptacle formed therewith and surrounding the same, a port in the top of said hood, and a circular float rigidly attached to the upper end of the said hood whereby to raise said stem and said hood to close said valve.

2. In a float actuated valve for commode tanks, in combination, a fitting in the bottom of a tank connected to a supply line, an anti-syphon tube connected at its lowermost end to said fitting, a ported seat in the bottom of said tube and a plurality of spaced perforated guides in said tube, a valve stem supported in said guides concentrically of said tube and extending thereabove, a tapered closure on the lower end of said stem engaging said seat to close the port therein, a cylindrical hood, having an annular receptacle formed with and surrounding the same and extending substantially the distance between said ported seat and the top of said tube, and a circular float rigidly attached to the top of said stem for actuating the same to close said valve.

3. In a float actuated valve for commode tanks, in combination with a water inlet fitting in the bottom of a tank having a supply pipe connected thereto, a tubular member connected to said fitting and extending upwardly to the normal water level in said tank, a ported seat in the lower end of the said tubular member, a valve stem operating concentrically of said tubular member and projecting thereabove, a closure on the lower end of said stem engaging and closing said seat when said stem is raised, a cylindrical hood concentrically surrounding said tubular member and supported by said stem, the said hood having a vent in its upper end, an annular receptacle formed with and surrounding said hood, and a float secured to the upper end of said stem for actuating said closure to its seat.

4. In a float actuated valve for commode tanks, in combination with a fitting in the bottom of a tank having connection with a water supply pipe, a flow tube connected to said fitting and extending upwardly therein, a ported seat in the bottom of said tube, a stem operative concentrically of said tube and extending thereabove, a closure on said stem for said seat, a cylindrical hood supported on said stem and suspended concentrically of said tube and having a vent in its upper closed end, an annular receptacle forming a part of and surrounding said hood, and a circular float attached to the upper end of said stem for actuating the closure to its seat.

5. In a float actuated valve for commode tanks, in combination, a fitting in the bottom of a tank for connecting a supply pipe thereto, a water supply tube connected to said fitting and rising in said tank, a ported seat in the lower end of said tube, a stem operating concentrically of said tube and having a closure on its lower end operable to close said seat, a portion of said stem extending above said tube, a cylindrical hood supported on the upper end of said stem and suspended concentrically about said tube, an annular receptacle formed with and surrounding said hood and extending upwardly to define an annular compartment therearound, and an annular float supported on the upper end of said stem and surrounding the upper end of said hood.

6. In a float actuated valve for commode tanks, in combination, a fitting for a supply pipe connected in the bottom of a tank, an inlet tube attached to said fitting and rising in said tank, a ported seat in the lower end of the said tube, a valve stem operable concentrically of said tube and having a closure on its lower end engageable with said seat and having its upper end projecting above said tube, a hood member attached to the upper end of said stem and suspended concentrically about said tube, the said hood member having an external upturned flange defining an annular receptacle therearound, and an annular float attached to and surrounding said stem.

References Cited in the file of this patent

UNITED STATES PATENTS

| Number | Name | Date |
| --- | --- | --- |
| 393,621 | Cook et al. | Nov. 27, 1888 |
| 1,143,000 | Voigt | June 15, 1915 |
| 1,241,982 | Hufferd | Oct. 2, 1917 |
| 1,477,916 | Sikes et al. | Dec. 18, 1923 |
| 1,589,786 | Bradshaw | June 22, 1926 |
| 2,444,958 | Smith | July 13, 1948 |